(12) United States Patent
Koum et al.

(10) Patent No.: US 9,992,258 B2
(45) Date of Patent: Jun. 5, 2018

(54) TECHNIQUES FOR MANAGING A REMOTE WEB CLIENT FROM AN APPLICATION ON A MOBILE DEVICE

(71) Applicant: WhatsApp Inc., Mountain View, CA (US)

(72) Inventors: Jan Koum, Santa Clara, CA (US);
Brian Acton, Santa Clara, CA (US);
Jonathan Loh, Santa Clara, CA (US);
Pasha Sadri, Menlo Park, CA (US)

(73) Assignee: WHATSAPP INC., Menlo Park, CA (US)

( * ) Notice: Subject to any disclaimer, the term of this patent is extended or adjusted under 35 U.S.C. 154(b) by 429 days.

(21) Appl. No.: 14/676,881

(22) Filed: Apr. 2, 2015

(65) Prior Publication Data
US 2016/0205169 A1 Jul. 14, 2016

Related U.S. Application Data

(60) Provisional application No. 62/102,815, filed on Jan. 13, 2015.

(51) Int. Cl.
*G06F 15/16* (2006.01)
*H04L 29/08* (2006.01)
(Continued)

(52) U.S. Cl.
CPC ............ *H04L 67/025* (2013.01); *H04L 51/16* (2013.01); *H04W 4/12* (2013.01)

(58) Field of Classification Search
CPC ......... H04L 67/02; H04L 51/16; H04L 51/32; H04L 67/025; H04L 67/04; H04L 67/10; H04W 4/12
See application file for complete search history.

(56) References Cited

U.S. PATENT DOCUMENTS 8,751,582 B1 * 6/2014 Behforooz ............ H04L 51/043
709/206
2004/0202117 A1 10/2004 Wilson et al.
(Continued)

FOREIGN PATENT DOCUMENTS

| KR | 20140073771 | 6/2014 | |
|----|----|----|----|
| WO | WO 2014061897 A1 * | 4/2014 | ............ H04L 67/42 |
| WO | 2014088241 | 6/2014 | |

OTHER PUBLICATIONS

Extended European Search Report received for European Patent Application No. 15188488.9, dated Mar. 24, 2016, 12 pages.
(Continued)

*Primary Examiner* — Shean Tokuta

(57) ABSTRACT

Techniques for managing a remote web client from an application on a mobile device are described. In one embodiment, an apparatus may comprise a messaging application operative on the processor circuit to receive a request from a remote web browser, the request for the remote web browser to receive messaging updates from the messaging application; establish an encrypted connection between the messaging application and the remote web browser; receive a messaging update at the messaging application; and transmit the messaging update from the messaging application to the remote web browser. Other embodiments are described and claimed.

17 Claims, 10 Drawing Sheets

(51) Int. Cl.
*H04W 4/12* (2009.01)
*H04L 12/58* (2006.01)

(56) References Cited

U.S. PATENT DOCUMENTS

| | | |
|---|---|---|
| 2007/0033255 A1 | 2/2007 | Sanjeeva et al. |
| 2008/0248834 A1 | 10/2008 | Chatterjee et al. |
| 2011/0231407 A1 | 9/2011 | Gupta et al. |
| 2012/0028615 A1 | 2/2012 | Sundaramurthy et al. |
| 2012/0059875 A1* | 3/2012 | Clark ............... H04L 67/14 709/203 |
| 2012/0059887 A1* | 3/2012 | Oberle ............... H04L 51/04 709/206 |
| 2012/0066319 A1 | 3/2012 | Koch et al. |
| 2012/0079043 A1* | 3/2012 | Brown ............... H04L 67/04 709/206 |
| 2014/0136638 A1* | 5/2014 | Zhang ............... H04L 51/04 709/206 |
| 2016/0323231 A1* | 11/2016 | Lee ............... H04L 67/02 |

OTHER PUBLICATIONS

Krishnakumar et al., "Seamless session mobility using short range communication technologies", IEEE International Conference on Communications, XP032632628, Jun. 10, 2014, 6 pages.

Tuit, Sander, "Webversie WhatsApp Messenger op komst'—Apps", <http://androidworld.nl/apps/webversie-whatsapp//, retrieved Mar. 15, 2016, 24 pages (Section-p. 8-9).

International Search Report and Written Opinion received for PCT Patent Application No. PCT/US2015/024187, dated Oct. 12, 2015, 13 pages.

Office Action received for European Patent Application No. 15188488.9, dated Jul. 14, 2017, 9 pages.

* cited by examiner

*500*

Receive a request at a messaging application on a mobile device from a remote web browser, the request for the remote web browser to receive messaging updates from the messaging application.
502

Establish an encrypted connection between the messaging application and the remote web browser.
504

Receive a messaging update at the messaging application.
506

Transmit the messaging update from the messaging application to the remote web browser.
508

*FIG. 5*

TECHNIQUES FOR MANAGING A REMOTE WEB CLIENT FROM AN APPLICATION ON A MOBILE DEVICE

RELATED APPLICATIONS

This application claims the benefit of priority under 35 U.S.C. § 119(e) to U.S. Provisional Patent Application No. 62/102,815, titled "Techniques for Managing a Remote Web Client from an Application on a Mobile Device," filed on Jan. 13, 2015, which is hereby incorporated by reference in its entirety.

BACKGROUND

Users of mobile devices, such as smartphones, may use their mobile devices to execute applications. These applications may perform communications and network tasks on behalf of their user. An application may comprise a messaging application for messaging between users. Users may use the messaging application to converse with friends and may value having access to the messaging application.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for managing a remote web client from an application on a mobile device. Some embodiments are particularly directed to techniques for managing a remote web client for a messaging service from a messaging application on a mobile device where the messaging application is the source of truth for a user's interaction with the messaging service. In one embodiment, for example, an apparatus may comprise a messaging application operative on the processor circuit to receive a request from a remote web browser, the request for the remote web browser to receive messaging updates from the messaging application; establish an encrypted connection between the messaging application and the remote web browser; receive a messaging update at the messaging application; and transmit the messaging update from the messaging application to the remote web browser. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a computer-implemented method comprises:
 receiving a request at a messaging application on a mobile device from a remote web browser, the request for the remote web browser to receive messaging updates from the messaging application;
 establishing an encrypted connection between the messaging application and the remote web browser;
 receiving a messaging update at the messaging application; and
 transmitting the messaging update from the messaging application to the remote web browser.

In an embodiment according to the invention, the method further may comprise that the encrypted connection is transmitted via a remote web server.

In an embodiment according to the invention, the messaging application may be associated with a first user account with a messaging service, the remote web server may be operative to cache messaging state for the first user account for a future web browser session, the method further may comprise that access to the messaging state cached on the remote web server is controlled by the messaging application on the mobile device.

In an embodiment according to the invention, the messaging application may be associated with a first user account with a messaging service, the messaging update may correspond to a messaging conversation between the first user account and a second user account, the method further may comprise:
 retrieving messaging state associated with the first user account from a local store on the mobile device, the messaging state comprising at least a portion of a contact list for the first user account, the messaging state comprising a history of the messaging conversation between the first user account and the second user account; and
 transmitting the messaging state to the remote web browser.

In an embodiment according to the invention, the method further may comprise:
 retrieving the contact list for the first user account; and
 determining the portion of the contact list based on messaging activity of the contacts in the contact list.

In an embodiment according to the invention, the method further may comprise:
 capturing a machine-readable optical label using a camera device of the mobile device, the machine-readable optical label displayed by the remote web browser;
 extracting a web session identifier from the machine-readable optical label; and
 identifying the remote web browser for the establishment of the encrypted connection based on the web session identifier.

In an embodiment according to the invention, the messaging application may be associated with a first user account with a messaging service, the method further may comprise:

receiving an outgoing message from the remote web browser over the encrypted connection, the outgoing message associated with a messaging conversation with a second user account of the messaging service; and transmitting the outgoing message to a second messaging application, the second messaging application associated with the second user account.

In a further embodiment according to the invention, which can be claimed as well, an apparatus comprises:

a processor circuit on a mobile device;

a messaging application operative on the processor circuit to receive a request from a remote web browser, the request for the remote web browser to receive messaging updates from the messaging application; establish an encrypted connection between the messaging application and the remote web browser; receive a messaging update at the messaging application; and transmit the messaging update from the messaging application to the remote web browser.

In a further embodiment according to the invention, the apparatus may comprise that the encrypted connection may be transmitted via a remote web server.

In a further embodiment according to the invention, the messaging application may be associated with a first user account with a messaging service, the remote web server may be operative to cache messaging state for the first user account for a future web browser session, the apparatus further may comprise that access to the messaging state cached on the remote web server may be controlled by the messaging application on the mobile device.

In a further embodiment according to the invention, the messaging application may be associated with a first user account with a messaging service, the messaging update may be corresponding to a messaging conversation between the first user account and a second user account, the messaging application may further be operative to retrieve messaging state associated with the first user account from a local store on the mobile device, the messaging state may comprise at least a portion of a contact list for the first user account, the messaging state may comprise a history of the messaging conversation between the first user account and the second user account; and the apparatus further may transmit the messaging state to the remote web browser.

In a further embodiment according to the invention, the messaging application further may be operative to retrieve the contact list for the first user account; and the apparatus further may determine the portion of the contact list based on messaging activity of the contacts in the contact list.

In a further embodiment according to the invention, the messaging application further may be operative to capture a machine-readable optical label using a camera device of the mobile device, the machine-readable optical label may be displayed by the remote web browser; the apparatus further may extract a web session identifier from the machine-readable optical label; and may identify the remote web browser for the establishment of the encrypted connection based on the web session identifier.

In a further embodiment according to the invention, the messaging application may be associated with a first user account with a messaging service, the messaging application further may be operative to receive an outgoing message from the remote web browser over the encrypted connection, the outgoing message may be associated with a messaging conversation with a second user account of the messaging service; and the apparatus further may transmit the outgoing message to a second messaging application, the second messaging application may be associated with the second user account.

In a further embodiment according to the invention, which can be claimed as well, at least one computer-readable storage medium comprises instructions that, when executed, cause a system to:

receive a request at a messaging application on a mobile device from a remote web browser, the request for the remote web browser to receive messaging updates from the messaging application;

establish an encrypted connection between the messaging application and the remote web browser;

receive a messaging update at the messaging application; and transmit the messaging update from the messaging application to the remote web browser.

In an embodiment according to the invention, the computer-readable storage medium further may comprise that the encrypted connection is transmitted via a remote web server.

In an embodiment according to the invention, the messaging application may be associated with a first user account with a messaging service, the remote web server may be operative to cache messaging state for the first user account for a future web browser session, the computer-readable storage medium further may comprise that access to the messaging state cached on the remote web server is controlled by the messaging application on the mobile device.

In an embodiment according to the invention, the messaging application may be associated with a first user account with a messaging service, the messaging update may correspond to a messaging conversation between the first user account and a second user account, the computer-readable storage medium further may comprise instructions that, when executed, cause a system to:

retrieve a contact list for the first user account; and determine a portion of the contact list based on messaging activity of the contacts in the contact list; or retrieve messaging state associated with the first user account from a local store on the mobile device, the messaging state comprising at least the portion of the contact list for the first user account, the messaging state comprising a history of the messaging conversation between the first user account and the second user account; and transmit the messaging state to the remote web browser.

In an embodiment according to the invention, the computer-readable storage medium further may comprising instructions that, when executed, cause a system to:

capture a machine-readable optical label using a camera device of the mobile device, the machine-readable optical label displayed by the remote web browser;

extract a web session identifier from the machine-readable optical label; and identify the remote web browser for the establishment of the encrypted connection based on the web session identifier.

In an embodiment according to the invention, the messaging application may be associated with a first user account with a messaging service, the computer-readable storage medium further may comprising instructions that, when executed, cause a system to:

receive an outgoing message from the remote web browser over the encrypted connection, the outgoing message associated with a messaging conversation with a second user account of the messaging service; and transmit the outgoing message to a second messaging application, the second messaging application associated with the second user account.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

BRIEF DESCRIPTION OF THE DRAWINGS

FIG. 5 illustrates an embodiment of a logic flow for the messaging web access system.

DETAILED DESCRIPTION

Figure 1:
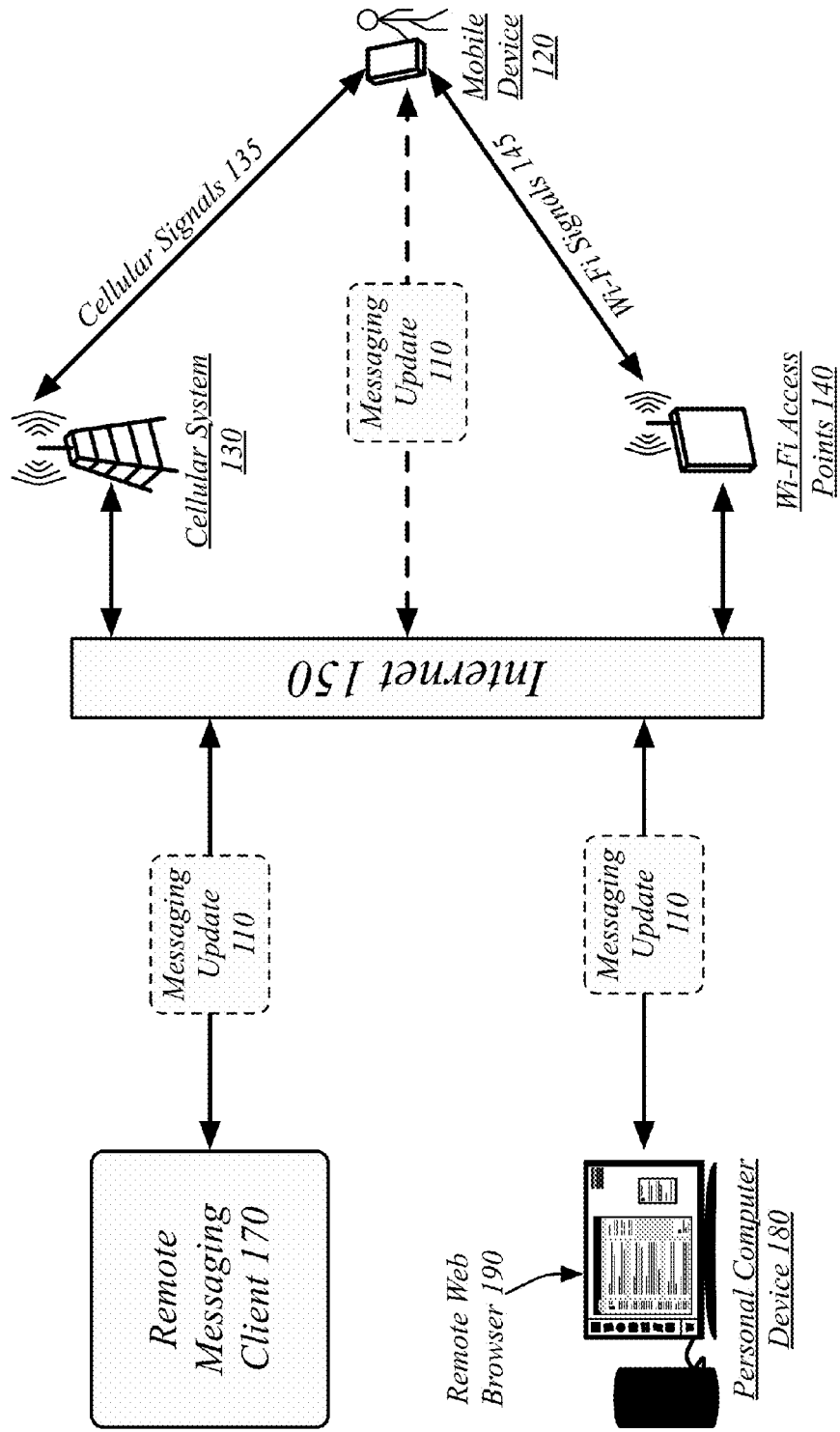
FIG. 1 illustrates an embodiment of a messaging web access system.

Various embodiments are directed to establishing a web browser as an access point to a messaging application on a mobile device. A messaging application may empower a user to message with other users as part of a messaging service. In some implementations, the messaging applications on mobile devices may be used as the authority for a user's access to a messaging service, as the single point of truth for a user with the messaging service, and as a repository for much of the information for the user's use of the messaging service. The mobile messaging application may therefore comprise a user's primary endpoint for interacting with the messaging service.

Users of the messaging service may sometimes wish to use a personal computer, such as a desktop computer or laptop computer, to access the messaging service. However, as the messaging application serves as the controlling endpoint for a user's interaction with the messaging service, the personal computer may not simply connect to the servers of the messaging service to use the messaging service in the same manner as the mobile device does. Instead, a web browser on the personal computer may be used to access the messaging application on the mobile device, so as to provide access on the personal computer to the messaging service while maintaining the messaging application's role as the controlling endpoint. As a result, access to the messaging service may be extended to personal computers while maintaining the primacy of mobile devices with the messaging service.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging web access system 100. In one embodiment, the messaging web access system 100 may comprise a computer-implemented system having software applications comprising one or more components. Although the messaging web access system 100 shown in FIG. 1 has a limited number of elements in a certain topology, it may be appreciated that the messaging web access system 100 may include more or less elements in alternate topologies as desired for a given implementation. As shown in FIG. 1, a remote web browser 190 on a personal computer device 180 may be used as an interface to a messaging application on a mobile device 120 that is carrying out a messaging conversation without a remote messaging client 170.

A mobile device 120 may communicate with other devices using wireless transmissions to exchange network traffic. Exchanging network traffic, such as may be included in the exchange of a messaging update 110, may comprise transmitting and receiving network traffic via a network interface controller (NIC). A NIC comprises a hardware component connecting a computer device, such as mobile device 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

A mobile device 120 may perform various operation using network data accessed over a network. The mobile device 120 may access a cellular system 130 using cellular signals 135. The cellular system 130 may be a cellular network including data access, the cellular system 130 provided by a cellular provider with which the user of the mobile device 120 has a service contract, the service contract for cellular data server to the mobile device 120. The mobile device 120 may use the cellular system 130 to access the public Internet 150 for interacting with one or more other devices.

The mobile device 120 may access one or more Wi-Fi access points 140 using Wi-Fi signals 145. Wi-Fi access points 140 may be provided by a plurality of different operators. Some of the Wi-Fi access points 140 may be personal in nature, such as a home Wi-Fi network operated by the user of mobile device 120 based on a domestic Internet connection. Some of the Wi-Fi access points 140 may be free of charge or provided as a complimentary portion of a service, such as free Wi-Fi service in coffee shops, hotels, and other public accommodations. The mobile device 120 may use Wi-Fi access points 140 to access the public Internet 150 for interacting with one or more other devices. The dashed line between the Internet 150 and mobile device 120 indicates that the messaging update 110 may be exchanged with other devices ultimately using the Internet 150, with one of the cellular system 130 and Wi-Fi access point 140 acting as the medium to access the Internet 150.

The mobile device 120 may engage in a messaging conversation with a remote local messaging application 220 170. The messaging conversation may comprise the exchange of messaging updates such as messaging update 110. Messaging updates may comprise messages, message status updates, and other updates to the status of a messaging conversation.

The same user of the mobile device 120 may own and operate a personal computer device 180. The personal computer device 180 may comprise a Mac OS® device, Windows® device, Linux® device, or other computer device running another operating system. The personal computer device 180 may be an Ethernet device capable of connecting to the Internet 150 via an Ethernet connection. In some embodiments and in some cases the personal computer device 180 may additionally or alternatively use cellular, Wi-Fi, or other networking technologies to the Internet 150. The personal computer device 180 may execute a web browser 190 to access a messaging application on the mobile device 120 and to receive messaging updates such as message update 110 from the messaging application on the mobile device 120.

Messaging web access system 100 may include an authorization server (or other suitable component(s)) that allows users to opt in to or opt out of having their actions logged by messaging web access system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of messaging web access system 100 and other elements of a social-networking system through blocking, data hashing, anonymization, or other suitable techniques as appropriate.

Figure 2:
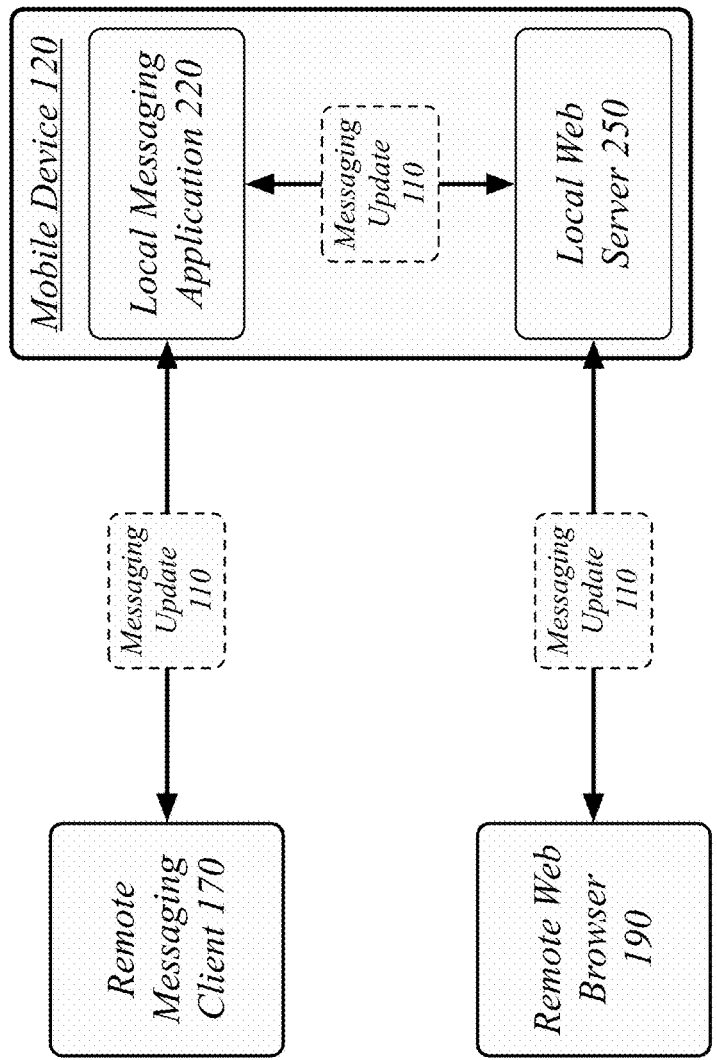
FIG. 2 illustrates an embodiment of the messaging web access system in which a local web server executes on the mobile device.

FIG. 2 illustrates an embodiment of the messaging web access system 100 in which a local web server 250 executes on the mobile device 120.

As shown in FIG. 2, the mobile device 120 may execute a local messaging application 220. The local messaging application 220 may be operated by a user of the mobile device 120 to exchange messages with other users via the exchange of messages with their respective devices. A message may comprise one or more of a text sequence, image file, video file, sound file, and any other form of media file. The local messaging application 220 may use an interface on the mobile device 120 for displaying messages received from other users, receiving the entry of messages by the user of the mobile device 120, and for displaying other user interface elements related to messaging.

The local messaging application 220 may be a dedicated local messaging application 220 that has a primary purpose of messaging. A dedicated local messaging application 220 may be specifically associated with a messaging provider administering the messaging platform including a messaging server or may be a general client operative to work with a plurality of different messaging providers including the messaging provider administering the messaging platform including the messaging server 110.

Alternatively, the local messaging application 220 may be a component of an application providing additional functionality. For example, a social networking service may provide a social networking application for use on a mobile device for accessing and using the social networking service. The social networking service may include messaging functionality, with the local messaging application 220 providing access to the messaging functionality of the social networking service to the user of the mobile device 120.

The local messaging application 220 may be operative to receive a request from a remote web browser 190, the request for the remote web browser 190 to receive messaging updates from the local messaging application 220. This request may be received via a hypertext transport protocol (HTTP) request for a web page associated with a web interface to the messaging functionality of the local messaging application 220. An HTTP request may be received as a hypertext transport protocol secure (HTTPS) or other secure variation to the HTTP standard. This request may be received via the selection of a web-based messaging option on a web page.

The local messaging application 220 may establish an encrypted connection between the local messaging application 220 and the remote web browser 190 in response to the request to receive messaging updates. The local messaging application 220 may receive a messaging update 110 at the local messaging application 220 and transmit the messaging update from the messaging application to the remote web browser. The messaging update 110 may be automatically transmitted in response to the local messaging application 220 receiving the messaging update 110 in order to keep the remote web browser 190 up-to-date with the messaging conversation.

In order to maintain the proper flow of conversations and updates the remote web browser 190 and local messaging application 220 may benefit from maintaining a strict ordering on messaging updates. The local messaging application 220 may serve as the point of control for the ordering and may assign an ordering to messaging updates based on the order the updates are received and generated from the perspective of the local messaging application 220. As such, for each messaging update 110 received, the local messaging application 220 may assign a sequence number to the messaging update 110 prior to transmitting the messaging update 110 to the remote web browser 190. In some embodiments, when the local messaging application 220 is the only messaging endpoint the maintenance of a strict ordering may not be beneficial. As such, the local messaging application 220 may assign a sequence number to the messaging update 110 based on the local messaging application 220 performing messaging update forwarding to a remote web browser 190.

In response to the received request from the remote web browser 190 to receive messaging updates from the local messaging application 220, the local messaging application 220 may initiate a local web server 250 on the mobile device 120, with the encrypted connection being between the local web server 250 and the remote web browser 190. The local web server 250 may be part of the local messaging application 220, may be a process executing as part of the local messaging application 220, or may comprise a distinct application on the mobile device 120 launched in response to a command by the local messaging application 220.

In some cases, the local web server 250 and remote web browser 190 may communicate using the infrastructure of the public Internet 150. However, in some cases, the encrypted connection may be transmitted via a peer-to-peer network connection. The peer-to-peer network connection may comprise, without limitation, one of a Bluetooth connection and a direct Wi-Fi connection between the mobile device 120 and personal computer device 180.

The local messaging application 220 may be associated with a first user account with a messaging service. The messaging update may have been received from a second messaging application on a second mobile device, the second messaging application associated with a second user account with the messaging service. The messaging update 110 may therefore comprise a message in a messaging conversation between the first user account and the second user account. This may be a message sent from the first user account to the second user account or a message sent from the second user account to the first user account. The message may comprise one or more of a text segment, an image, a video segment, and an audio segment.

In some cases, the message may comprise a media segment such as a video segment or an audio segment. A web server, such as the local web server 250, may transcode the media segment to a media format supported by the remote web browser 190 prior to transmitting the messaging update 110 to the remote web browser 190. In some embodiments, the remote web browser 190 may transmit supported formats to the local web server 250, with the local web server 250 using the received supported formats to determine the format to transcode media segments into. In other embodiments, the local web server 250 may be configured with a list of web-compatible media formats and transcode the media segments into one of the configured web-compatible media formats.

The remote web browser 190 may be used to originate messages as well as being used to view messaging originating from the mobile device 120 or remote messaging client 170. The local messaging application 220 may receive an outgoing message from the remote web browser 190 over the encrypted connection, the outgoing message associated with a messaging conversation with a second user account of the messaging service. The local messaging application 220 may transmit the outgoing message to a second messaging application, the second messaging application associated with the second user account. This second messaging application may correspond to the remote messaging client 170.

In some embodiments, an originating messaging endpoint may be notified when a message sent from that originating endpoint is displayed on the destination messaging endpoint. As such, the local messaging application 220 may receive an acknowledgement of the outgoing message from the second messaging application and update the outgoing message with the remote web browser 190 according to the acknowledgement of the outgoing message. Updating the outgoing message with the remote web browser 190 may comprise displaying an icon, symbol, or other visual element adjacent to the outgoing message, the visual element visually associated with the a message being viewed by its recipient.

As part of establishing the remote web browser 190 as an endpoint for accessing the local messaging application 220 the web session of the remote web browser 190 may be loaded with messaging state for the user account associated with the local messaging application 220. The local messaging application 220 may retrieve messaging state associated with the user account from a local store on the mobile device 120 and transmit the messaging state to the remote web browser 190.

The messaging update may correspond to a messaging conversation between the first user account and a second user account. The messaging state may comprise a history of the messaging conversation between the first user account and the second user account. For example, the user of the mobile device 120 may engage in a messaging conversation with the user of a remote messaging client 170. Initially this conversation may use involve the direct use by the user of the local messaging application 220 on the mobile device 120. However, the user may at some point desire to start using their personal computer device 180 to continue the conversation. For example, the user may have been travelling to their home and using the mobile device 120 and then return home and want to use the personal computer device 180. By transmitting the history to the remote web browser 190 on the personal computer device 180 the user may not only continue the conversation but be reminded of the history of that, and other, conversations.

The messaging state may include additional or alternative information, such as the contact list for the first user account. In some cases, the full contact list of a user account may be too lengthy to efficiently send, and as such the messaging state may comprise a portion of the contact list for the first user account. The local messaging application 220 may retrieve the contact list for the first user account from a local store on the mobile device 120 and determine the portion of the contact list based on messaging activity of the contacts in the contact list.

Figure 3:
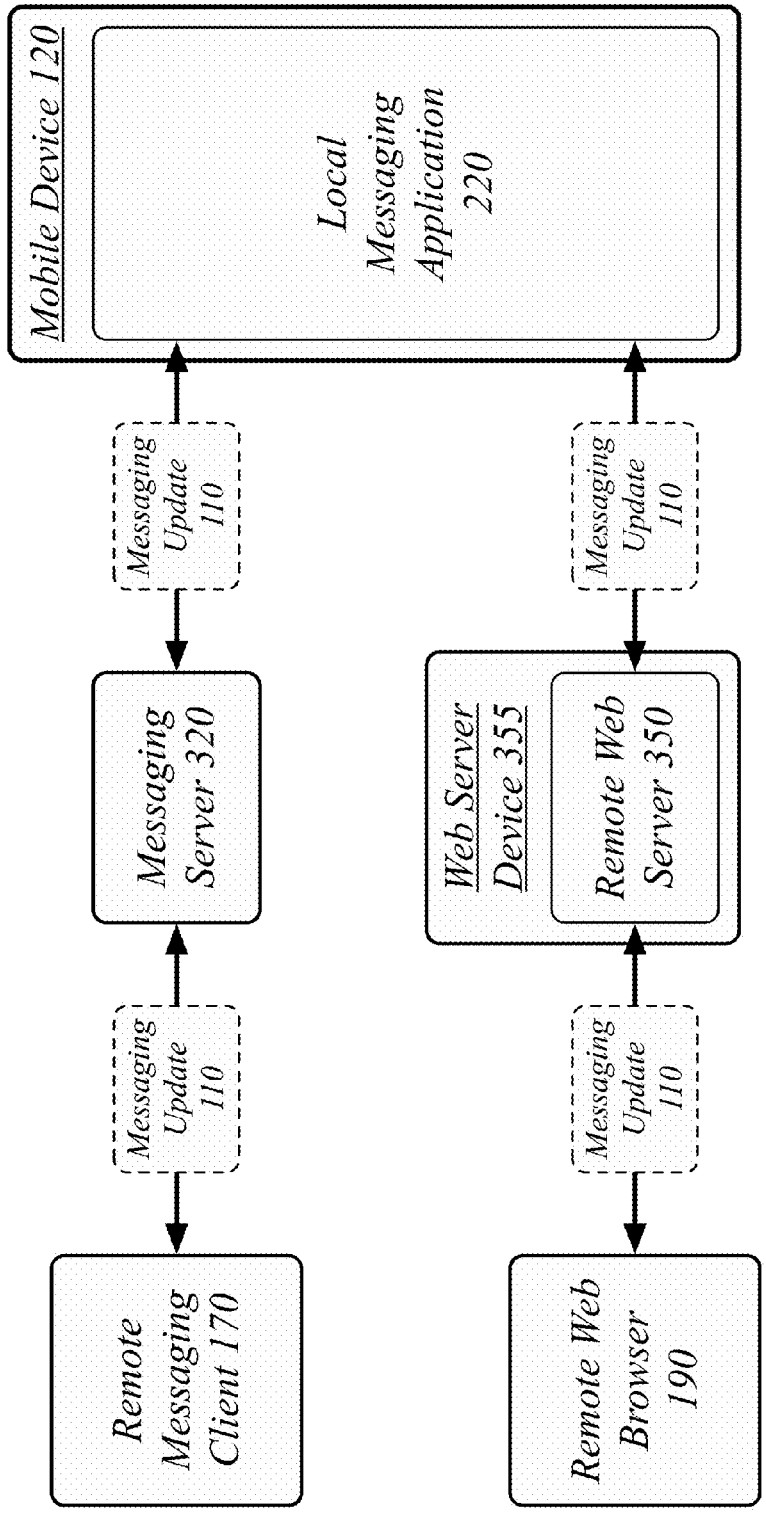
FIG. 3 illustrates an embodiment of the messaging web access system in which a remote web server executes on a separate web server device.

FIG. 3 illustrates an embodiment of the messaging web access system 100 in which a remote web server 350 executes on a separate web server device 355. As shown in FIG. 3, the interaction between the remote messaging client 170 may be performed via a messaging server 320. Both the messaging server 320 and web server device 355 may be administered by a messaging service provider administering the messaging platform including the local messaging application 220. It will be appreciated that in some embodiments only one of the messaging server 320 and web server device 355 may be used.

In some embodiments, the encrypted connection between the local messaging application 220 and the remote web browser 190 may be transmitted via a remote web server 350. The remote web server 350 may host a web session for the remote web browser 190, the web session allowing access to the local messaging application 220 on the mobile device 120 for the performance of messaging via the web session. As such, a first portion of the encrypted connection may comprise a secure connection, such as an encrypted transmission control protocol/internet protocol (TCP/IP) connection, between the local messaging application 220 and the web server device 355. A second portion of the encrypted connection may comprise an HTTPS connection between the remote web browser 190 and the remote web server 350. The remote web server 350 may therefore server as a bridge between the local messaging application 220 and the remote web browser 190 to maintain a secure connection for the entire length of the communication.

In some embodiments, the encrypted connection between the local messaging application 220 and the remote web browser 190 may be maintained through the remote web server 350 to prevent the remote web server 350 or web server device 355 from accessing the plaintext (i.e., unencrypted) contents of the encrypted connection. The remote web server 350 may serve as a relay for encrypted web pages and encrypted web elements (e.g., frames, images, and other elements sent as individual HTTPS interactions), the encrypted web pages and encrypted web elements encrypted by the local messaging application 220 and decrypted by the remote web browser 190 without the remote web server 350 or web server device 355 having access to the decryption keys for the encrypted web pages and end encrypted web elements.

The local messaging application 220 may be associated with a first user account with the messaging service. The remote web server 350 may be operative to cache messaging state for the first user account for a future web browser session. In some cases, the remote web browser 190 may receive state for the first user account. The remote web server 350 may cache this state in order to avoid the local messaging application 220 having to retransmit the state stored on the mobile device 120.

Access to the messaging state cached on the remote web server 350 may be controlled by the local messaging application 220 on the mobile device 120. The user of the local messaging application 220 may be empowered to instruct the local messaging application 220 to transmit deauthorization instructions to the remote web server 350, the deauthorization instructions deauthorizing the remote web browser 190 with the remote web server 350. This may prevent future use of the cached state by the remote web browser 190 unless the remote web browser 190 is reauthorized by the local messaging application 220. Similarly, this may prevent the future establishment of the remote web browser 190 as a messaging endpoint for the first user account unless the remote web browser 190 is reauthorized by the local messaging application 220. The remote web server 350 may, in response to receiving deauthorization instructions, modify a record of authorized end points to remove the remote web browser 190 from the list of authorized end points. The remote web server 350 may, in response to receiving deauthorization instructions, delete cached state for the remote web browser 190.

The remote web browser 190 may be provided authentication information to empower it to quickly reestablish the connection to the local messaging application 220 without the user having to perform connection establishment operations on the mobile device 120. The local messaging application 220 may transmit authentication information to the remote web browser 190; receive a second request at the local messaging application 220 on the mobile device 120 from the remote web browser 190, the request for the remote web browser to again receive messaging updates from the messaging application; and establish a second encrypted connection between the local messaging application 220 and the remote web browser 190 using the authentication information. The authentication information may comprise, without limitation, a secure token.

Various techniques may be used for identifying the remote web browser 190 for establishment of the encrypted connection. In some cases, a machine-readable optical label (e.g., a QR code) may be displayed on the remote web browser 190. This machine-readable optical label may be displayed by the remote web server 350 in response to the remote web browser 190 attempting to begin operating as a messaging endpoint and prior to the local messaging application 220 on the mobile device 120 being identified. The mobile device 120 may be connected to the remote web browser 190 based on the mobile device 120 capturing the machine-readable optical label and transmitting it to the messaging server 320, web server device 355, or some other component of the messaging web access system 100.

As such, the local messaging application 220 may capture a machine-readable optical label using a camera device of the mobile device 120, the machine-readable optical label displayed by the remote web browser 190. The local messaging application 220 may extract a web session identifier from the machine-readable optical label. The local messaging application 220 may identify the remote web browser 190 for the establishment of the encrypted connection based on the web session identifier.

The machine-readable optical label may be generated by the web server device 355 and transmitted to the remote web browser 190 by the remote web server 350. The web server device 355 may register the data encoded by the machine-readable optical label with a front-end for local messaging applications such as local messaging application 220. The local messaging application 220 may report the data encoded by the machine-readable optical label to the front-end to establish the connection between the local messaging application 220 and the remote web server 350 servicing the remote web browser 190 displaying the machine-readable optical label.

Figure 4:
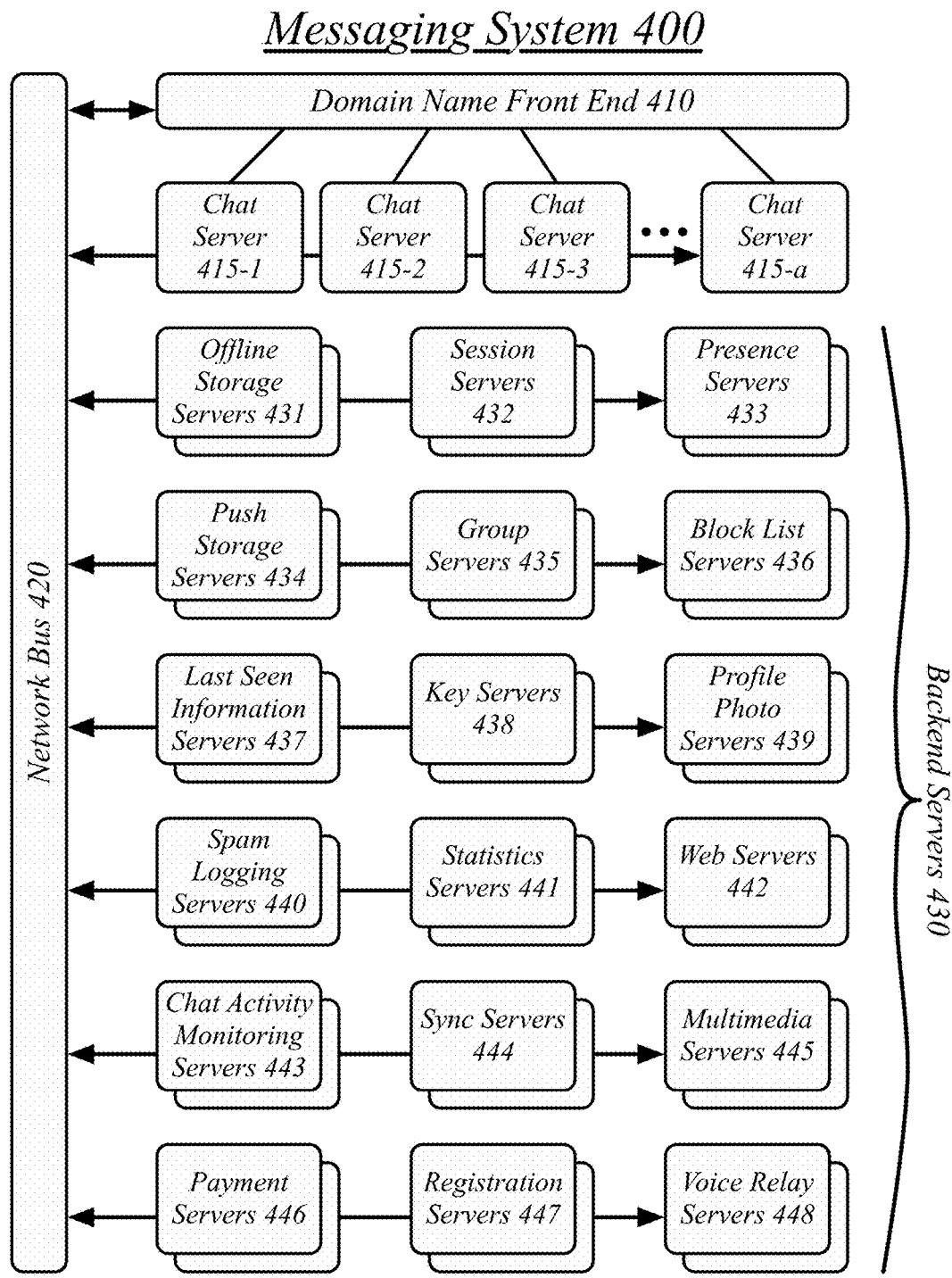
FIG. 4 illustrates an embodiment of a messaging system.

FIG. 4 illustrates an embodiment of a plurality of servers implementing various functions of a messaging system 400. It will be appreciated that different distributions of work and functions may be used in various embodiments of a messaging system 400. The messaging system 400 may comprise the messaging web access system 100 with the operations of the messaging web access system 100 comprising a portion of the overall operations of the messaging system 400.

The messaging system 400 may comprise a domain name front end 410. The domain name front end 410 may be assigned one or more domain names associated with the messaging system 400 in a domain name system (DNS). The domain name front end 410 may receive incoming connections and distribute the connections to servers providing various messaging services.

The messaging system 400 may comprise one or more chat servers 415. The chat servers 415 may comprise front-end servers for receiving and transmitting user-to-user messaging updates such as chat messages. Incoming connections may be assigned to the chat servers 415 by the domain name front end 410 based on workload balancing.

The messaging system 400 may comprise backend servers 430. The backend servers 430 may perform specialized tasks in the support of the chat operations of the front-end chat servers 415. A plurality of different types of backend servers 430 may be used. It will be appreciated that the assignment of types of tasks to different backend serves 430 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 400 may comprise one or more offline storage servers 431. The one or more offline storage servers 431 may store messaging content for currently-offline messaging endpoints in hold for when the messaging endpoints reconnect.

The messaging system 400 may comprise one or more sessions servers 432. The one or more session servers 432 may maintain session state of connected messaging endpoints.

The messaging system 400 may comprise one or more presence servers 433. The one or more presence servers 433 may maintain presence information for the messaging system 400. Presence information may correspond to user-specific information indicating whether or not a given user has an online messaging endpoint and is available for chatting, has an online messaging endpoint but is currently away from it, does not have an online messaging endpoint, and any other presence state.

The messaging system 400 may comprise one or more push storage servers 434. The one or more push storage servers 434 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 400 may comprise one or more group servers 435. The one or more group servers 435 may maintain lists of groups, add users to groups, remove users from groups, and perform the reception, caching, and forwarding of group chat messages.

The messaging system 400 may comprise one or more block list servers 436. The one or more block list servers 436 may maintain user-specific block lists, the user-specific incoming-block lists indicating for each user the one or more other users that are forbidden from transmitting messages to that user. Alternatively or additionally, the one or more block list servers 436 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 400 may comprise one or more last seen information servers 437. The one or more last seen information servers 437 may receive, store, and maintain information indicating the last seen location, status, messaging endpoint, and other elements of a user's last seen connection to the messaging system 400.

The messaging system 400 may comprise one or more key servers 438. The one or more key servers may host public keys for public/private key encrypted communication.

The messaging system 400 may comprise one or more profile photo servers 439. The one or more profile photo servers 439 may store and make available for retrieval profile photos for the plurality of users of the messaging system 400.

The messaging system 400 may comprise one or more spam logging servers 440. The one or more spam logging servers 440 may log known and suspected spam (e.g., unwanted messages, particularly those of a promotional nature). The one or more spam logging servers 440 may be operative to analyze messages to determine whether they are spam and to perform punitive measures, in some embodiments, against suspected spammers (users that send spam messages).

The messaging system 400 may comprise one or more statistics servers 441. The one or more statistics servers may compile and store statistics information related to the operation of the messaging system 400 and the behavior of the users of the messaging system 400.

The messaging system 400 may comprise one or more web servers 442. The one or more web servers 442 may engage in hypertext transport protocol (HTTP) and hypertext transport protocol secure (HTTPS) connections with web browsers. The one or more web servers 442 may, in some embodiments, host the remote web server 350 as part of the operation of the messaging web access system 100.

The messaging system 400 may comprise one or more chat activity monitoring servers 443. The one or more chat activity monitoring servers 443 may monitor the chats of users to determine unauthorized or discouraged behavior by the users of the messaging system 400. The one or more chat activity monitoring servers 443 may work in cooperation with the spam logging servers 440 and block list servers 436, with the one or more chat activity monitoring servers 443 identifying spam or other discouraged behavior and providing spam information to the spam logging servers 440 and blocking information, where appropriate to the block list servers 436.

The messaging system 400 may comprise one or more sync servers 444. The one or more sync servers 444 may sync the messaging system 440 with contact information from a messaging endpoint, such as an address book on a mobile phone, to determine contacts for a user in the messaging system 400.

The messaging system 400 may comprise one or more multimedia servers 445. The one or more multimedia servers may store multimedia (e.g., images, video, audio) in transit between messaging endpoints, multimedia cached for offline endpoints, and may perform transcoding of multimedia.

The messaging system 400 may comprise one or more payment servers 446. The one or more payment servers 446 may process payments from users. The one or more payment servers 446 may connect to external third-party servers for the performance of payments.

The messaging system 400 may comprise one or more registration servers 447. The one or more registration servers 447 may register new users of the messaging system 400.

The messaging system 400 may comprise one or more voice relay servers 448. The one or more voice relay servers 448 may relay voice-over-internet-protocol (VoIP) voice communication between messaging endpoints for the performance of VoIP calls.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a request at a local messaging application 220 on a mobile device 120 from a remote web browser 190, the request for the remote web browser 190 to receive messaging updates from the local messaging application 220 at block 502.

The logic flow 500 may establish an encrypted connection between the local messaging application 220 and the remote web browser 190 at block 504.

The logic flow 500 may receive a messaging update 110 at the local messaging application 220 at block 506.

The logic flow 500 may transmit the messaging update 110 from the local messaging application 220 to the remote web browser 190 at block 508.

The embodiments are not limited to this example.

Figure 6:
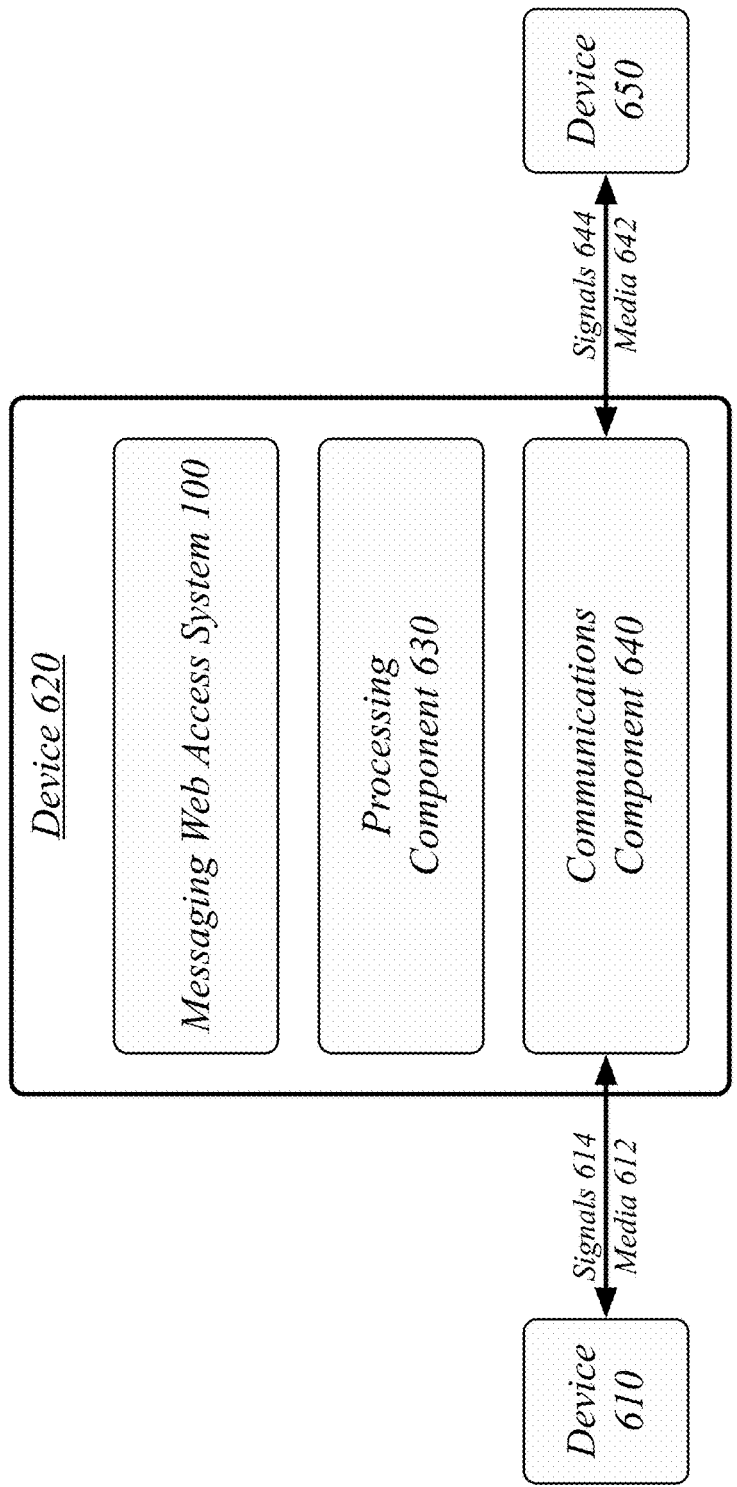
FIG. 6 illustrates an embodiment of a centralized system for the system of FIG. 1.

FIG. 6 illustrates a block diagram of a centralized system 600. The centralized system 600 may implement some or all of the structure and/or operations for the messaging web access system 100 in a single computing entity, such as entirely within a single device 620.

The device 620 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 620 may execute processing operations or logic for the system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 620 may execute communications operations or logic for the system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 620 may communicate with other devices 610, 650 over a communications media 612, 642, respectively, using communications signals 614, 644, respectively, via the communications component 640. The devices 610, 650 may be internal or external to the device 620 as desired for a given implementation. The device 610 may comprise a messaging endpoint, such as local messaging application 220 on mobile device 120. The device 650 may comprise a second messaging endpoint, such as remote web browser 190 on personal computer device 180. The signals 614 and 644 may jointly carry the encrypted connection between the local messaging application 220 and the remote web browser 190.

Figure 7:
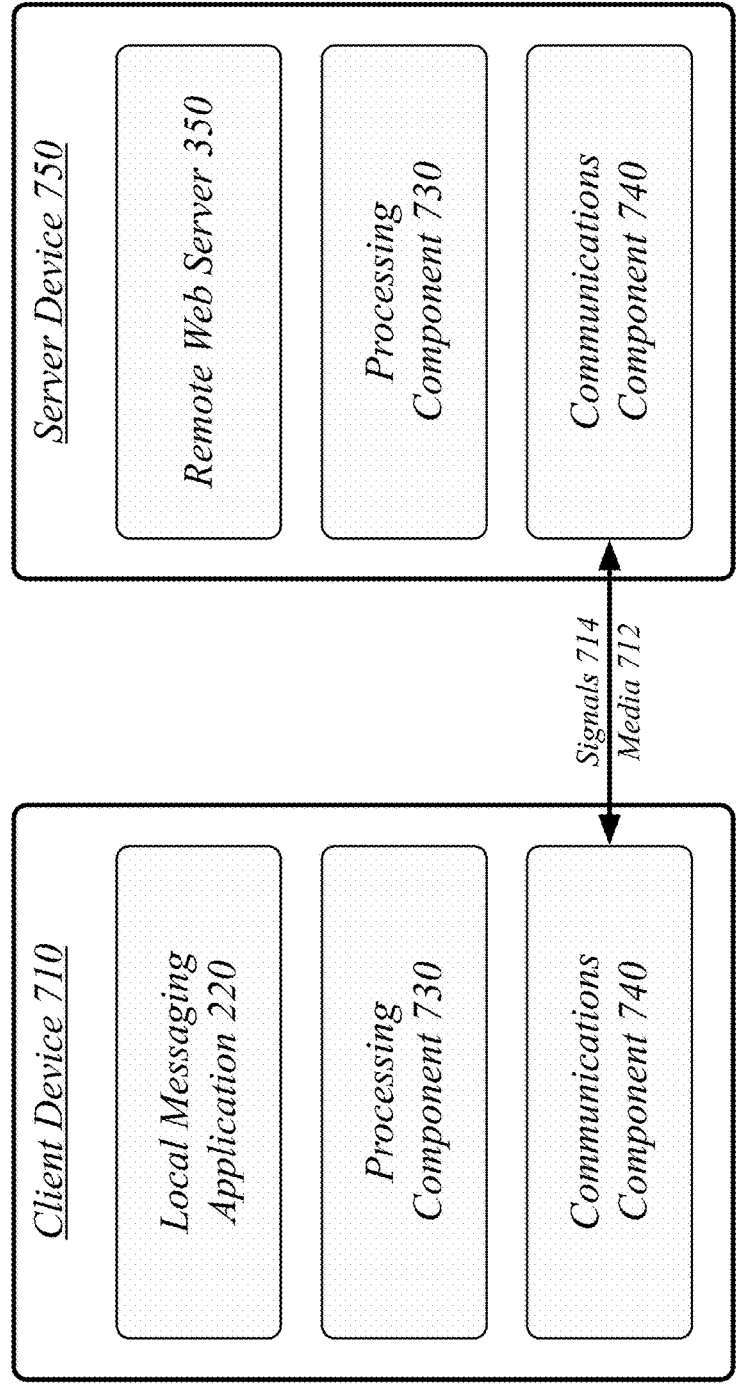
FIG. 7 illustrates an embodiment of a distributed system for the system of FIG. 1.

FIG. 7 illustrates a block diagram of a distributed system 700. The distributed system 700 may distribute portions of the structure and/or operations for the system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client device 710 and a server device 750. In general, the client device 710 and the server device 750 may be the same or similar to the client device 820 as described with reference to FIG. 6. For instance, the client system 710 and the server system 750 may each comprise a processing component 730 and a communications component 740 which are the same or similar to the processing component 630 and the communications component 640, respectively, as described with reference to FIG. 6. In another example, the devices 710, 750 may communicate over a communications media 712 using communications signals 714 via the communications components 740.

The client device 710 may comprise or employ one or more client programs that operate to perform various methodologies in accordance with the described embodiments. In one embodiment, for example, the client device 710 may implement the local messaging application 220.

The server device 750 may comprise or employ one or more server programs that operate to perform various methodologies in accordance with the described embodiments. In one embodiment, for example, the server device 750 may implement the remote web server 350.

Figure 8:
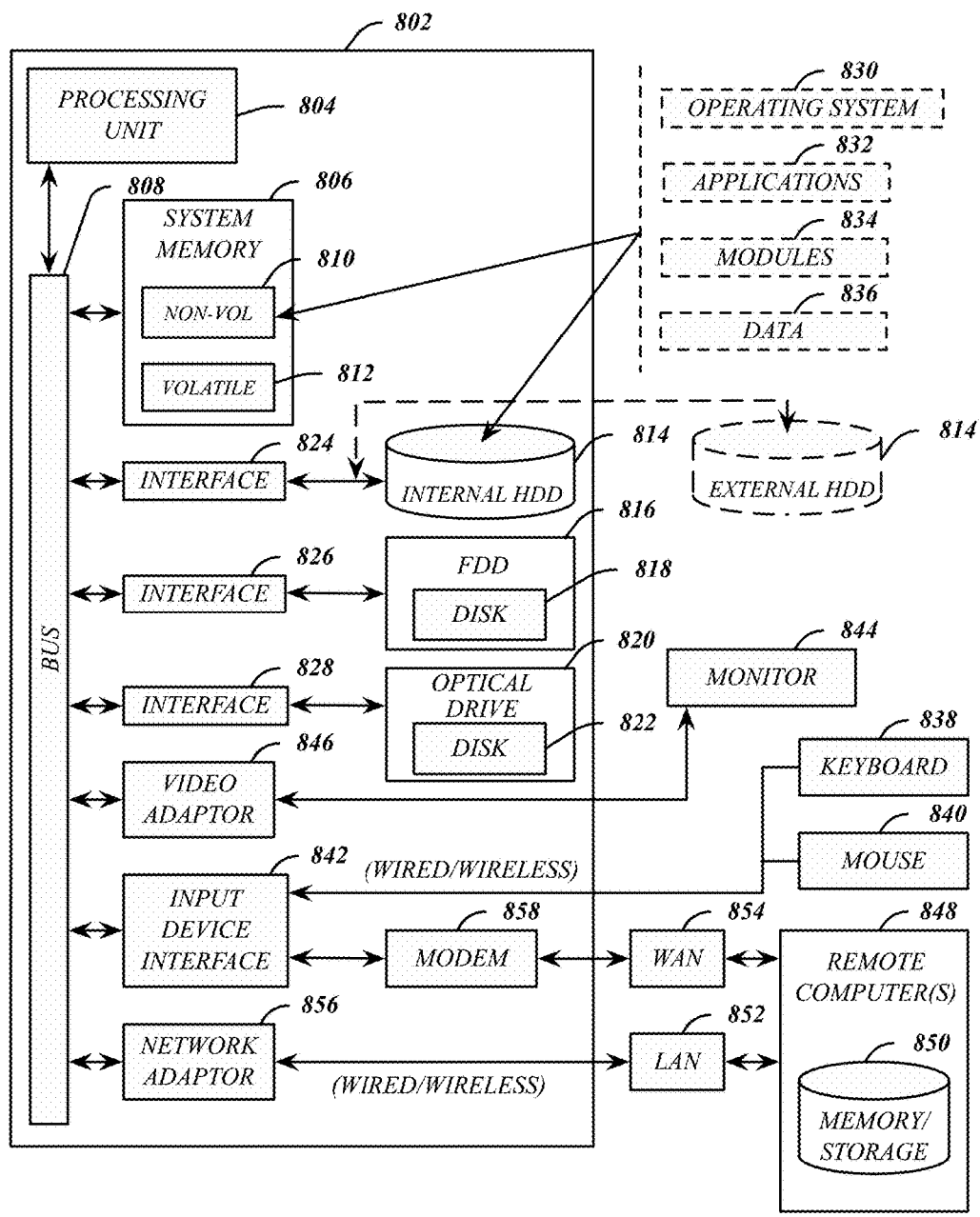
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 1, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the messaging web access system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.5 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.5x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
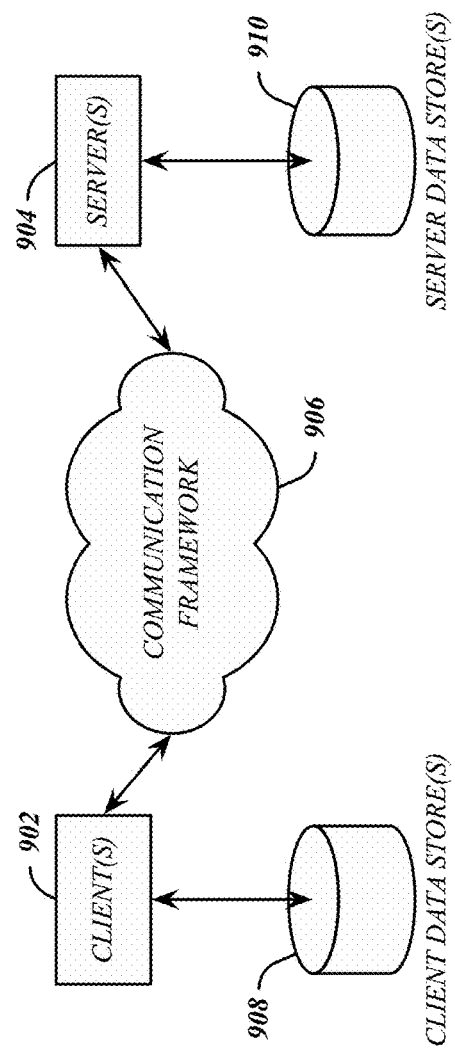
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement a client device such as the mobile device 120. The servers 904 may implement a server device such as the messaging server 320 or web server device 355. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
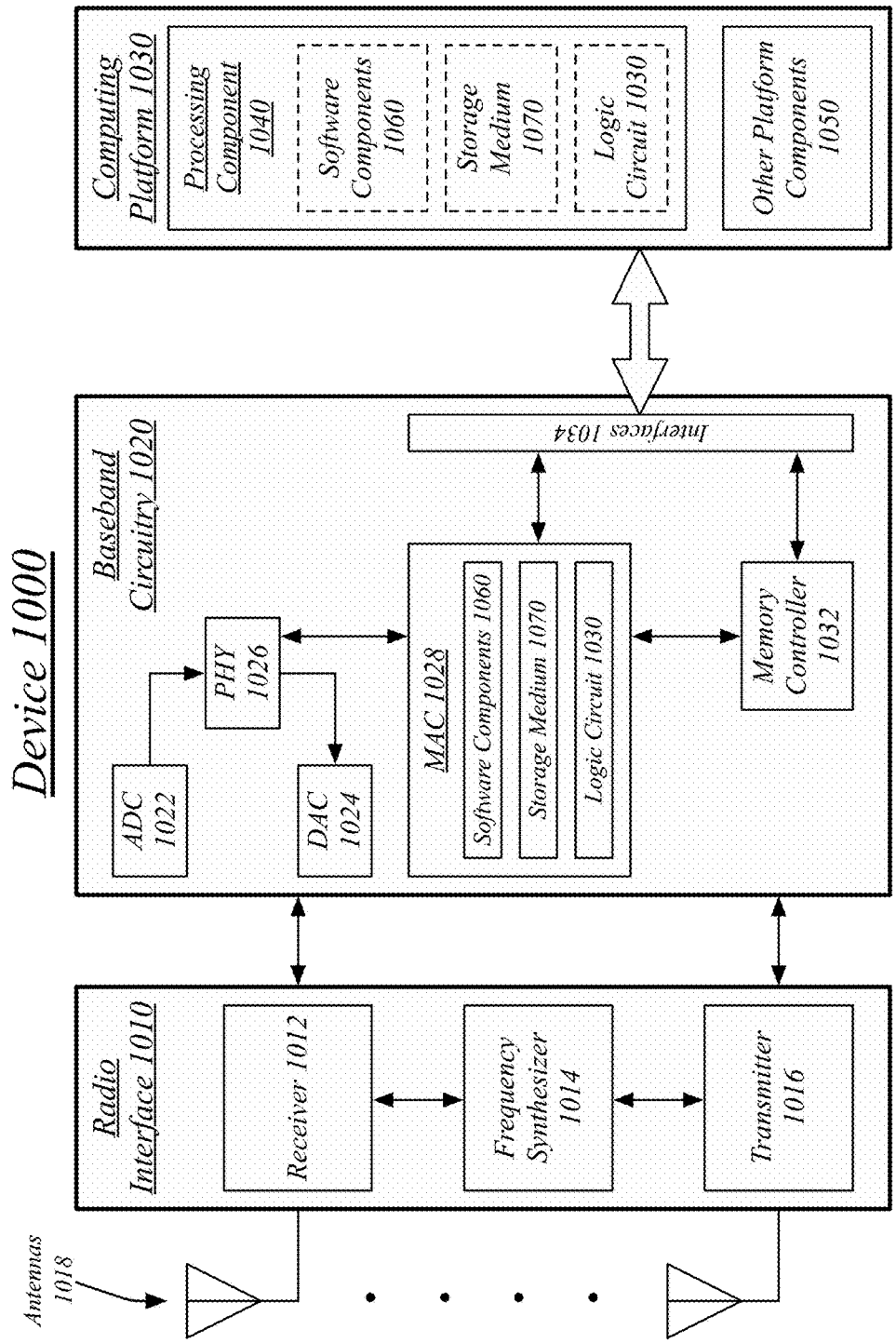
FIG. 10 illustrates an embodiment of a radio device architecture.

FIG. 10 illustrates an embodiment of a device 1000 for use in a multicarrier OFDM system, such as the messaging web access system 100. Device 1000 may implement, for example, software components 1060 as described with reference to messaging web access system 100 and/or a logic circuit 1030. The logic circuit 1030 may include physical circuits to perform operations described for the messaging web access system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the messaging web access system 100 and/or logic circuit 1030 in a single computing entity, such as entirely within a single device. Alternatively, the device 1000 may distribute portions of the structure and/or operations for the messaging web access system 100 and/or logic circuit 1030 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the messaging web access system 100 and logic circuit 1030 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a request at a messaging application on a mobile device from a remote web browser, the request for the remote web browser to receive messaging updates from the messaging application; establishing an encrypted connection between the messaging application and the remote web browser; receiving a messaging update at the messaging application; and transmitting the messaging update from the messaging application to the remote web browser.

A computer-implemented method may further comprise the messaging update automatically transmitted in response to the messaging application receiving the messaging update.

A computer-implemented method may further comprise initiating a web server on the mobile device, the encrypted connection between the web server and the remote web browser.

A computer-implemented method may further comprise the encrypted connection transmitted via a remote web server.

A computer-implemented method may further comprise the messaging application associated with a first user account with a messaging service, the remote web server operative to cache messaging state for the first user account for a future web browser session.

A computer-implemented method may further comprise wherein access to the messaging state cached on the remote web server is controlled by the messaging application on the mobile device.

A computer-implemented method may further comprise transmitting deauthorization instructions to the remote web server, the deauthorization instructions deauthorizing the remote web browser with the remote web server.

A computer-implemented method may further comprise the messaging application associated with a first user account with a messaging service, the messaging update received from a second messaging application on a second mobile device, the second messaging application associated with a second user account with the messaging service, the messaging update comprising a message in a messaging conversation between the first user account and the second user account.

A computer-implemented method may further comprise the message sent from the first user account to the second user account or the message sent from the second user account to the first user account.

A computer-implemented method may further comprise the message comprising one or more of a text segment, an image, a video segment, and an audio segment.

A computer-implemented method may further comprise the message comprising a media segment, the media segment comprising one of a video segment and an audio segment, further comprising: transcoding the media segment to a media format supported by the remote web browser prior to transmitting the messaging update to the remote web browser.

A computer-implemented method may further comprise the messaging application associated with a first user account with a messaging service, further comprising: retrieving messaging state associated with the first user account from a local store on the mobile device; and transmitting the messaging state to the remote web browser.

A computer-implemented method may further comprise the messaging update corresponding to a messaging conversation between the first user account and a second user account, the messaging state comprising a history of the messaging conversation between the first user account and the second user account.

A computer-implemented method may further comprise the messaging state comprising at least a portion of a contact list for the first user account.

A computer-implemented method may further comprise retrieving the contact list for the first user account; and determining the portion of the contact list based on messaging activity of the contacts in the contact list.

A computer-implemented method may further comprise the encrypted connection transmitted via a peer-to-peer network connection.

A computer-implemented method may further comprise the peer-to-peer network connection comprising one of a Bluetooth connection and a Wi-Fi connection.

A computer-implemented method may further comprise capturing a machine-readable optical label using a camera device of the mobile device, the machine-readable optical label displayed by the remote web browser; extracting a web session identifier from the machine-readable optical label; and identifying the remote web browser for the establishment of the encrypted connection based on the web session identifier.

A computer-implemented method may further comprise the messaging application associated with a first user account with a messaging service, further comprising: receiving an outgoing message from the remote web browser over the encrypted connection, the outgoing message associated with a messaging conversation with a second user account of the messaging service; and transmitting the outgoing message to a second messaging application, the second messaging application associated with the second user account.

A computer-implemented method may further comprise receiving an acknowledgement of the outgoing message from the second messaging application; and updating the outgoing message with the remote web browser according to the acknowledgement of the outgoing message.

A computer-implemented method may further comprise assigning a sequence number to the messaging update prior to transmitting the messaging update to the remote web browser.

A computer-implemented method may further comprise transmitting authentication information to the remote web browser; receiving a second request at the messaging application on the mobile device from the remote web browser, the request for the remote web browser to again receive messaging updates from the messaging application; and establishing a second encrypted connection between the messaging application and the remote web browser using the authentication information.

An apparatus may comprise a processor circuit on a mobile device; a messaging application operative on the processor circuit to receive a request from a remote web browser, the request for the remote web browser to receive messaging updates from the messaging application; establish an encrypted connection between the messaging application and the remote web browser; receive a messaging update at the messaging application; and transmit the messaging update from the messaging application to the remote web browser. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   transmitting request to a messaging application on a mobile device, the request originating at a remote web browser, the request for the remote web browser to receive messaging updates from the messaging application, the messaging application associated with a first user account with a messaging service:
   caching, at a web server, a messaging state for the first user account, wherein access to the messaging state cached on the web server is controlled by the messaging application on the mobile device:
   establishing an encrypted connection between the messaging application and the remote web browser, the establishing comprising:
   establishing a first encrypted connection between a local messaging application of a mobile device and a web server: and
   establishing a second encrypted communication session between a remote web browser and the web server:
   receiving, at the web server, a messaging update from the messaging application;
   caching the messaging update in the cache; and
   transmitting, by the web server, the messaging update to the remote web browser.

2. The method of claim 1, the encrypted connection transmitted via the web server.

3. The method of claim 1, the messaging application associated with a first user account with a messaging service, the messaging update corresponding to a messaging conversation between the first user account and a second user account, further comprising:
   retrieving messaging state associated with the first user account from a local store on the mobile device, the messaging state comprising at least a portion of a contact list for the first user account, the messaging state comprising a history of the messaging conversation between the first user account and the second user account; and transmitting the messaging state to the remote web browser.

4. The method of claim 3, further comprising: retrieving the contact list for the first user account; and
   determining the portion of the contact list based on messaging activity of the contacts in the contact list.

5. The method of claim 1, further comprising:
   capturing a machine-readable optical label using a camera device of the mobile device, the machine-readable optical label displayed by the remote web browser;
   extracting a web session identifier from the machine-readable optical label; and identifying the remote web browser for the establishment of the encrypted connection based on the web session identifier.

6. The method of claim 1, the messaging application associated with a first user account with a messaging service, further comprising:
   receiving an outgoing message from the remote web browser over the encrypted connection, the outgoing message associated with a messaging conversation with a second user account of the messaging service; and
   transmitting the outgoing message to a second messaging application, the second messaging application associated with the second user account.

7. An apparatus, comprising:
   a processor circuit;
   a web server operative on the processor circuit to transmit a request originating at a remote web browser to a messaging application on a mobile device, the request for the remote web browser to receive messaging updates from the messaging application, the messaging application associated with a first user account with a messaging service;
   cache, at the web server, a messaging state for the first user account, wherein access to the messaging state cached on the web server is controlled by the messaging application on the mobile device;
   establish an encrypted connection between the messaging application and the remote web browser, the establishing comprising establishing a first encrypted connection between a local messaging application of a mobile device and a web server, and establishing a second encrypted communication session between a remote web browser and the web server;
   receive, at the web server, a messaging update from the messaging application;
   cache the messaging update in the cache;
   and transmit, from the web server, the messaging update to the remote web browser.

8. The apparatus of claim 7, the encrypted connection transmitted via the web server.

9. The apparatus of claim 7, the messaging application associated with a first user account with a messaging service, the messaging update corresponding to a messaging conversation between the first user account and a second user account, the messaging application further operative to retrieve messaging state associated with the first user account from a local store on the mobile device, the messaging state comprising at least a portion of a contact list for the first user account, the messaging state comprising a history of the messaging conversation between the first user account and the second user account; and transmit the messaging state to the remote web browser.

10. The apparatus of claim 9, the messaging application further operative to retrieve the contact list for the first user account; and determine the portion of the contact list based on messaging activity of the contacts in the contact list.

11. The apparatus of claim 7, the messaging application further operative to capture a machine-readable optical label using a camera device of the mobile device, the machine-readable optical label displayed by the remote web browser; extract a web session identifier from the machine-readable optical label; and identify the remote web browser for the establishment of the encrypted connection based on the web session identifier.

12. The apparatus of claim 7, the messaging application associated with a first user account with a messaging service, the messaging application further operative to receive an outgoing message from the remote web browser over the encrypted connection, the outgoing message associated with a messaging conversation with a second user account of the messaging service; and transmit the outgoing message to a second messaging application, the second messaging application associated with the second user account.

13. At least one non-transitory computer-readable storage medium comprising instructions that, when executed, cause a system to:
transmit a request to a messaging application on a mobile device, the request originating at a remote web browser, the request for the remote web browser to receive messaging updates from the messaging application, the messaging application associated with a first user account with a messaging service;
cache, at a web server, a messaging state for the first user account, wherein access to the messaging state cached on the web server is controlled by the messaging application on the mobile device;
establish an encrypted connection between the messaging application and the remote web browser, the establishing comprising:
establishing a first encrypted connection between a local messaging application of a mobile device and a web server;
establishing a second encrypted communication session between a remote web browser and the web server:
receive, at the web server, a messaging update from the messaging application;
cache the messaging update in the cache; and
transmit, by the web server, the messaging update to the remote web browser.

14. The computer-readable storage medium of claim 13, the encrypted connection transmitted via the web server.

15. The computer-readable storage medium of claim 13, the messaging application associated with a first user account with a messaging service, the messaging update corresponding to a messaging conversation between the first user account and a second user account, comprising further instructions that, when executed, cause a system to:
retrieve a contact list for the first user account; and
determine a portion of the contact list based on messaging activity of the contacts in the contact list,
retrieve messaging state associated with the first user account from a local store on the mobile device, the messaging state comprising at least the portion of the contact list for the first user account, the messaging state comprising a history of the messaging conversation between the first user account and the second user account; and transmit the messaging state to the remote web browser.

16. The computer-readable storage medium of claim 13, comprising further instructions that, when executed, cause a system to:
capture a machine-readable optical label using a camera device of the mobile device, the machine-readable optical label displayed by the remote web browser;
extract a web session identifier from the machine-readable optical label; and identify the remote web browser for the establishment of the encrypted connection based on the web session identifier.

17. The computer-readable storage medium of claim 13, the messaging application associated with a first user account with a messaging service, comprising further instructions that, when executed, cause a system to:
receive an outgoing message from the remote web browser over the encrypted connection, the outgoing message associated with a messaging conversation with a second user account of the messaging service; and
transmit the outgoing message to a second messaging application, the second messaging application associated with the second user account.

* * * * *